United States Patent
Karram et al.

(10) Patent No.: US 10,612,418 B2
(45) Date of Patent: Apr. 7, 2020

(54) NESTED FLANGE JOINT

(71) Applicant: GM GLOBAL TECHNOLOGY OPERATIONS LLC, Detroit, MI (US)

(72) Inventors: Michael A. Karram, Flint, MI (US); David A. Wulbrecht, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 85 days.

(21) Appl. No.: 15/928,157

(22) Filed: Mar. 22, 2018

(65) Prior Publication Data
US 2019/0292946 A1   Sep. 26, 2019

(51) Int. Cl.
| | |
|---|---|
| *F01D 25/24* | (2006.01) |
| *F16L 23/02* | (2006.01) |
| *F16L 23/032* | (2006.01) |
| *F16L 23/028* | (2006.01) |
| *F02B 37/00* | (2006.01) |

(52) U.S. Cl.
CPC ............ *F01D 25/243* (2013.01); *F16L 23/02* (2013.01); *F16L 23/0283* (2013.01); *F16L 23/032* (2013.01); *F02B 37/00* (2013.01); *F05D 2220/40* (2013.01); *F05D 2230/21* (2013.01); *F05D 2230/232* (2013.01); *F05D 2260/30* (2013.01)

(58) Field of Classification Search
CPC ... F01D 25/243; F16L 23/0283; F16L 23/032; F16L 23/02; F05D 2220/40; F05D 2230/21; F05D 2230/232; F05D 2260/30; F02B 37/00

USPC .................... 60/602, 605.1, 605.2
See application file for complete search history.

(56) References Cited

U.S. PATENT DOCUMENTS

| | | | | |
|---|---|---|---|---|
| 2,701,528 | A | * | 2/1955 | Angell ..................... F04D 13/04 417/407 |
| 3,652,176 | A | * | 3/1972 | Walsh ...................... F01D 5/043 415/9 |
| 4,458,924 | A | | 7/1984 | Schlicht |
| 4,484,771 | A | | 11/1984 | Schulz |
| 5,964,574 | A | * | 10/1999 | Meier ...................... F01D 9/045 415/110 |
| 6,777,505 | B2 | | 8/2004 | Takai et al. |

(Continued)

FOREIGN PATENT DOCUMENTS

| | | |
|---|---|---|
| AT | 307832 T | 11/2005 |
| DE | 1960147 U | 5/1967 |

(Continued)

*Primary Examiner* — Hoang M Nguyen
(74) *Attorney, Agent, or Firm* — Cantor Colburn LLP (57) ABSTRACT

The present disclosure provides flanged joint or interface between two passageways. The flanged joint includes a first passageway, a connector, and a second passageway. The first passageway may, but not necessarily, be formed via casting process wherein an integrated flange may be defined at the opening of the first passageway such that the integrated flange defines a recess. The connector includes a support body having a fastener region at an upper end of the support body and a flange region at a lower end of the support body. The support body defines an aperture which is configured to support the second passageway. The flange region defined in connector is configured to engage with a recess defined in the first passageway.

19 Claims, 8 Drawing Sheets

(56) References Cited

U.S. PATENT DOCUMENTS

| | | | | |
|---|---|---|---|---|
| 8,857,178 B2 * | 10/2014 | O'Hara | ............... | F01D 9/026 |
| | | | | 29/889.2 |
| 2010/0041287 A1 * | 2/2010 | Woods | ............... | B63H 21/32 |
| | | | | 440/89 R |
| 2013/0047605 A1 * | 2/2013 | Drangel | ............ | F02B 39/005 |
| | | | | 60/605.1 |
| 2013/0205775 A1 * | 8/2013 | Begin | ............... | F01D 25/166 |
| | | | | 60/605.3 |
| 2016/0273548 A1 * | 9/2016 | Uesugi | ............ | F04D 29/4206 |

FOREIGN PATENT DOCUMENTS

| | | |
|---|---|---|
| DE | 2236562 | 5/1967 |
| DE | 7127540 U | 5/1967 |
| DE | 124715 C | 11/2005 |
| EP | 0025070 | 5/1967 |
| FR | 674447 A | 1/1930 |

\* cited by examiner

NESTED FLANGE JOINT

TECHNICAL FIELD

The present disclosure relates to joints between two passageways, and more particularly to an ergonomic, space-efficient flange interface at a joint in high performance structures such as those in a vehicle engine.

BACKGROUND

A variety of flanges are known for removably connecting pipe sections, for installing fittings in piping, for connecting pipes or fittings to containers and the like, and for connecting flanged pipes or covers onto containers and the like. In general, the flanges or flanging include a smooth ring of rectangular cross-section.

Flange rings are also known which are of U-shaped cross-section. In the apparatus described in DE7127540, the U-shaped profile of the flange ring adds to the strength and stability of the flange, making possible a reduction in the amount of material used. As described in DE2236562, a circular receiving seat of an expansion joint is supported by a U-shaped flange ring with one side of the circular seat being supported on the inner ridge of the U-shaped flange ring and otherwise on the inner edge of the U-shaped flange ring.

A flange joint is constructed with the object of achieving a secure seal of the flange to the connection point while keeping cost as low as possible. In furtherance of this object, high quality material is used where corrosive material comes into contact with the flange joint and lower quality material can be used for other flange joint parts.

Conventional flanges constructed in the above-described manner have not been entirely satisfactory. Since the clamping bolts which are tightened to effect sealing are disposed about the flange spaced radially from the sealing surfaces, the pressing force generated by tightening the clamping bolts develops a bending moment on the flange which brings about an inclined positioning of the sealing surfaces in relation to each other. The sealing or packing which is disposed adjacent to the sealing surface is accordingly deformed in cross section into the shape of a wedge which is thinner at the outer portion of the sealing as a result of higher forces being applied thereat. This occurs in the flange joint disclosed in FR674447, in which a flange ring of rectangular cross-section bent into a U-shape is disposed at the end of a pipe. The pressing force brought about by tightening the clamping bolts is exerted largely along the outer edge of the U-shaped part of the flange and from there transmitted to the sealing surface, so that the sealing is progressively compacted from the outer edge radially inwardly, resulting in greater compression along the outer portion of the sealing. In DE1960147, the sealing is deliberately non-uniformly compressed with the greatest pressure occurring between the inner and outer portions of the sealing.

In the apparatus disclosed in FR6474447 and DE1960147, a bending moment set up in the flange ring about its outside edge as the clamping bolts are tightened lifts the inner rim of the flange ring up from the bearing surface at the end of the pipe. To prevent this, a flange connection such as the one disclosed in EP0025070 is used. That flange connection comprises an inner rim welded to or on the pipe, pipe nozzle, fitting or container, and an outer rim on a section of the flange disposed radially inwardly from the holes for the clamping bolts but as close as possible thereto which forms the rest and support for the flange ring. The base or flanged area of the outer rim forms the sealing area and an abutment for a flange ring of L-shaped cross section is provided on the inner rim of the ring form part. The abutment supports the inner edge of the flange ring against forces produced by tightening the clamping bolts and prevents an axial movement of the flange ring on the pipe. The apparatus described in this paragraph does not achieve the object described above and does not achieve uniform compression of the sealing.

SUMMARY

The present disclosure provides a flanged joint or interface between two passageways. The integrated flange joint includes a first passageway, a connector, and a second passageway. The first passageway may, but not necessarily, be formed via casting process wherein an integrated flange may be defined at the opening of the first passageway such that the integrated flange defines a recess. The connector includes a support body having a fastener region at an upper end of the support body and a flange region at a lower end of the support body. The support body defines an aperture which is configured to support the second passageway. The flange region defined in the connector is configured to engage with a recess defined in the first passageway. The recess may or may not be in the form of a v-shape while the flange region may or may not have a v-shaped cross-section. The integrated flange joint further includes at least one mechanical fastener configured to affix the connector and the second passageway to the first passageway while also driving the flange region into the recess of the of the first passageway. It is understood that the second passageway may be welded to the aperture defined by the support body.

In yet another embodiment, a turbocharger assembly is provided which includes a turbocharger housing which defines a bore, a journal bearing disposed with the bore, a rotating assembly, a connector, and an exhaust pipe. The turbocharger housing may further include a turbine housing which surrounds the turbine wheel. The rotating assembly includes a shaft with a turbine wheel on a first end of the shaft and a compressor wheel on a second end of the shaft. The shaft may be supported the journal bearing for rotation within the bore about a longitudinal axis. The connector may be affixed to the turbocharger housing via a fastener and via an engagement between a flange region of the connector with a recess defined by the turbocharger housing. The exhaust pipe may be coupled to the turbocharger housing via the connector.

The recess may be defined at a lower region of the turbine outlet in the turbocharger housing. The recess may, but not necessarily, be a v-shaped groove. The flange region of the connector may, but not necessarily have a v-shaped cross section configured to be at least partially disposed in the v-shaped groove of the recess.

It is further understood that least one mechanical fastener is implemented to affix the connector at a fastener region of the connector to the turbocharger housing (at the turbine housing). A gasket may be disposed between the connector and the turbocharger housing. The mechanical fastener(s) may be configured to compress the gasket between the connector and the turbine outlet while also driving the flange region into the recess as the at least one mechanical fastener couples the connector and exhaust pipe to the turbocharger housing. The exhaust pipe may be welded to the connector about the circumference of the aperture in the connector.

In yet another embodiment of the present disclosure, a method for manufacturing a turbocharger assembly includes the steps of: (1) providing a turbocharger which defines a recess in the turbocharger housing; (2) providing an exhaust pipe welded to a connector which defines flange region and a fastener region; (3) inserting the flange region of the connector into the recess of the turbocharger housing; and (4) affixing the connector and the exhaust pipe to the turbocharger housing via at least one mechanical fastener at the fastener region of the connector.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Figure 1A:
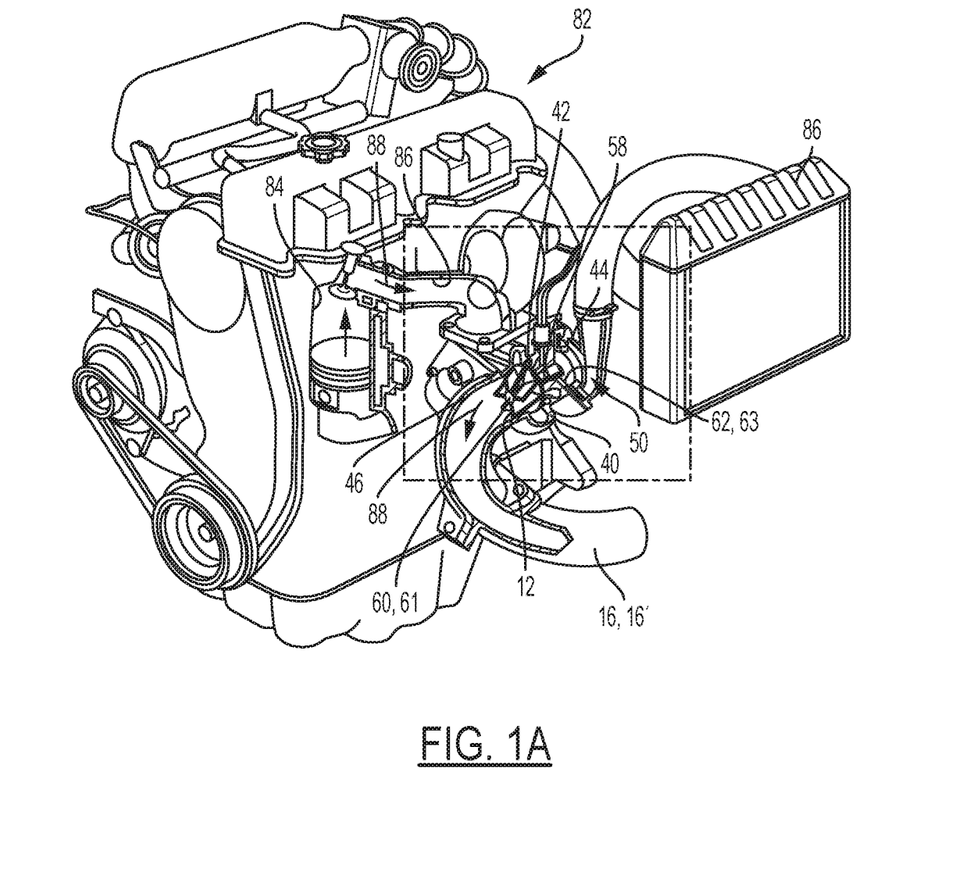
FIG. 1A is a perspective view of a turbocharger assembled to a vehicle engine system.
Figure 1B:
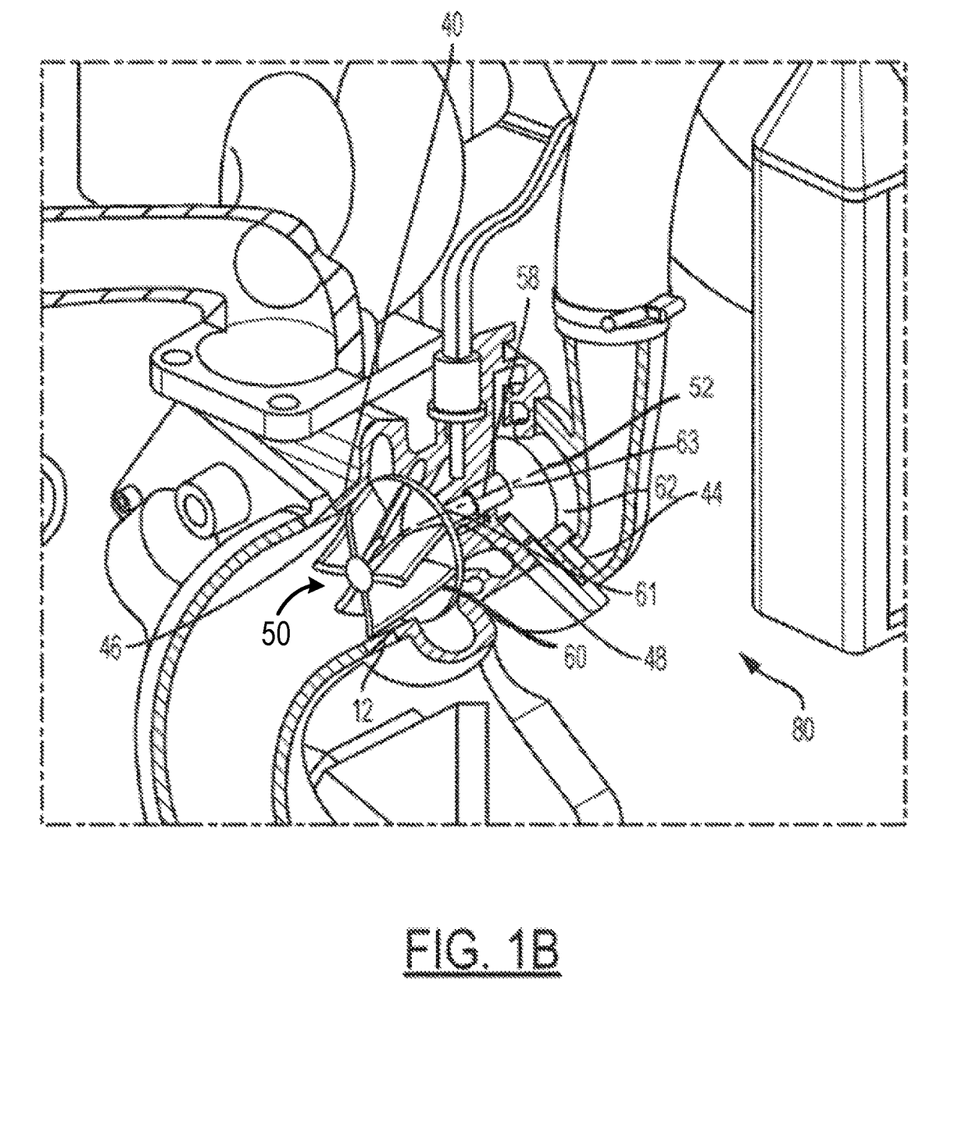
FIG. 1B is an enlarged view of the turbocharger assembly of FIG. 1A.

Referring now to FIGS. 1A and 1B, an embodiment of an internal combustion engine assembly 82 includes a combustion chamber 84, the exhaust manifold 86, the turbocharger assembly 80, the exhaust pipe 16' and a charge air cooler 86. As is shown, exhaust gases 88 from each combustion chamber 84 may travel through the exhaust manifold 86 to the turbocharger assembly 80. The exhaust gases 88 propel the turbine wheel 60 within the turbocharger assembly 80 and then travel from the turbocharger assembly 80 to the catalytic converter (not shown) via the exhaust pipe 16'. Given the high temperatures at the turbine wheel 60 and at the exhaust pipe 16', the exhaust pipe 16' is typically formed from a high weight material such as cast steel, or stainless steel and cast iron. Moreover, on the opposite end of the exhaust pipe 16', a catalytic converter (not shown) is affixed to the pipe wherein the catalytic converter includes a ceramic brick which further adds to the high weight issue presented in the assembly process.

Figure 2A:
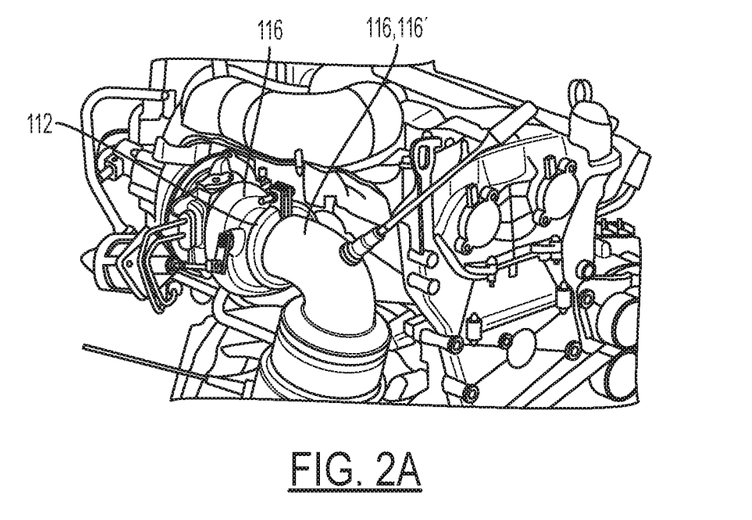
FIG. 2A is an enlarged view of a traditional turbocharger-exhaust pipe joint using a V-band clamp.
Figure 2B:
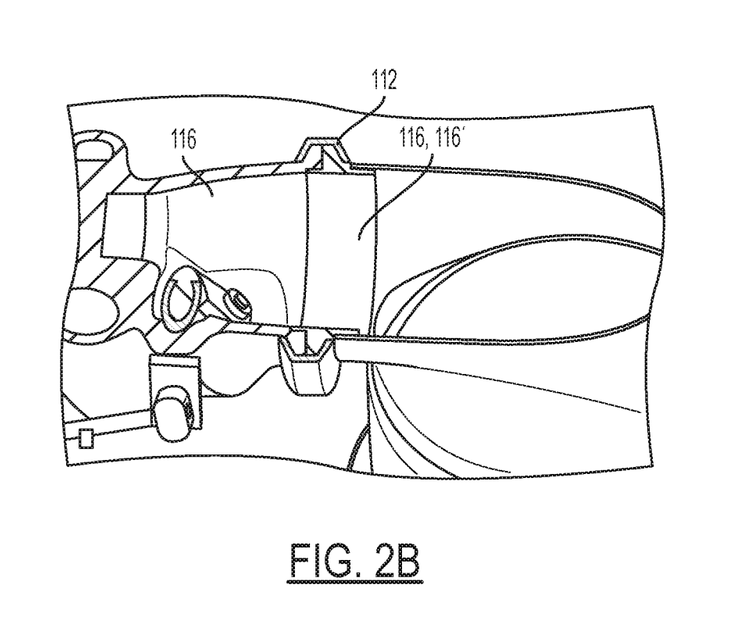
FIG. 2B is a cross-sectional view of the turbocharger joint in FIG. 2A.
Figure 3:
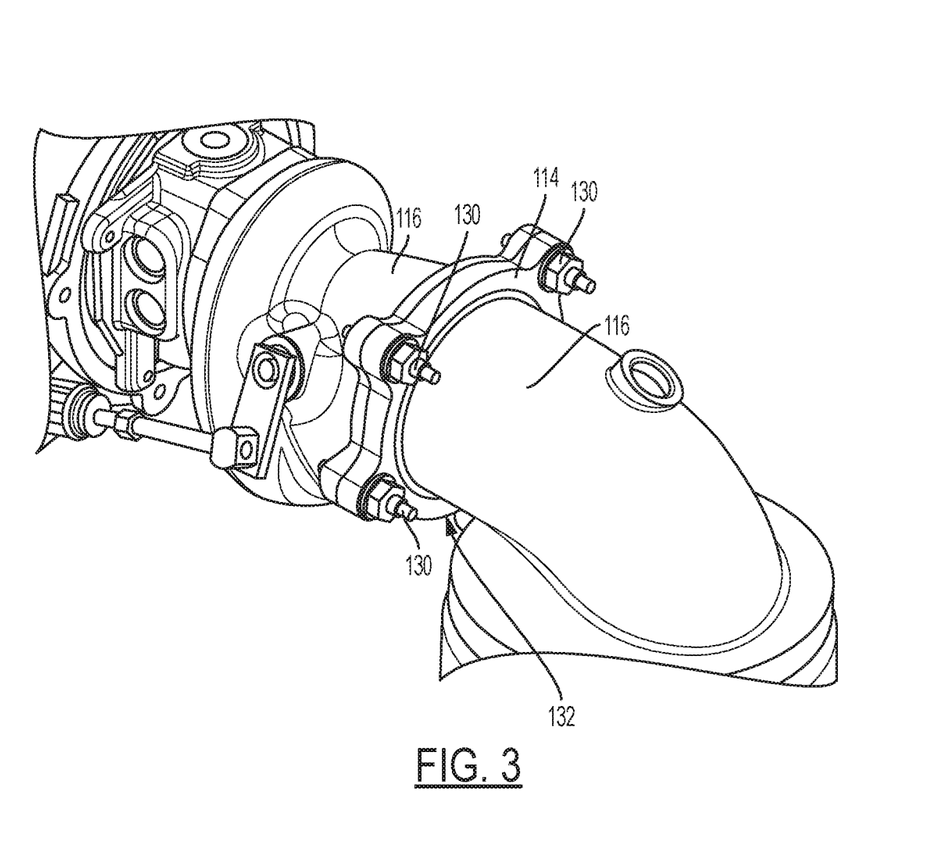
FIG. 3 is an enlarged view of another traditional turbocharger-exhaust pipe joint using a 4-bolt flange.

When assembling the exhaust system in a vehicle, it may also be challenging to fasten the exhaust components to each other given that space is very limited for an operator in this region of the vehicle (i.e., at the turbine outlet 46) and the exhaust components are rather heavy. In traditional exhaust assembly arrangements, v-band clamps 112 may be used as shown in FIGS. 2A-2B, or a four-bolt flange 114 may be used to mate the exhaust components 116 to one another as shown in FIG. 3. V-band clamps 112 (FIGS. 2A-2B) may be subject to operating stresses such that a V-band clamp 112 may deform over time as the V-band clamp 112 is subjected to the heavy loads imposed by the exhaust pipe 116' at that joint. As a result, the joint between the turbocharger and the exhaust pipe 116' may weaken as the V-band clamp 112 deforms. Additional supporting bracketry is required to aid assembly and support operating stresses thereby increasing assembly time and piece costs. With respect to the traditional four-bolt flange arrangement 114 (FIG. 3) used at the joint between a traditional turbocharger and exhaust pipe 116', an assembly operator is required to attach the mechanical fasteners 130 in four different locations such that, at least two locations are proximate to the underside 132 of the exhaust pipe 16' where space and access to this region is extremely limited. As a result, assembly time may be extensive in order to ensure that all mechanical fasteners 130 are sufficiently secured. As a result, the present disclosure provides for an improved connector 12 which reduces assembly time while requiring fewer parts- thereby lowering cost.

Figure 4:
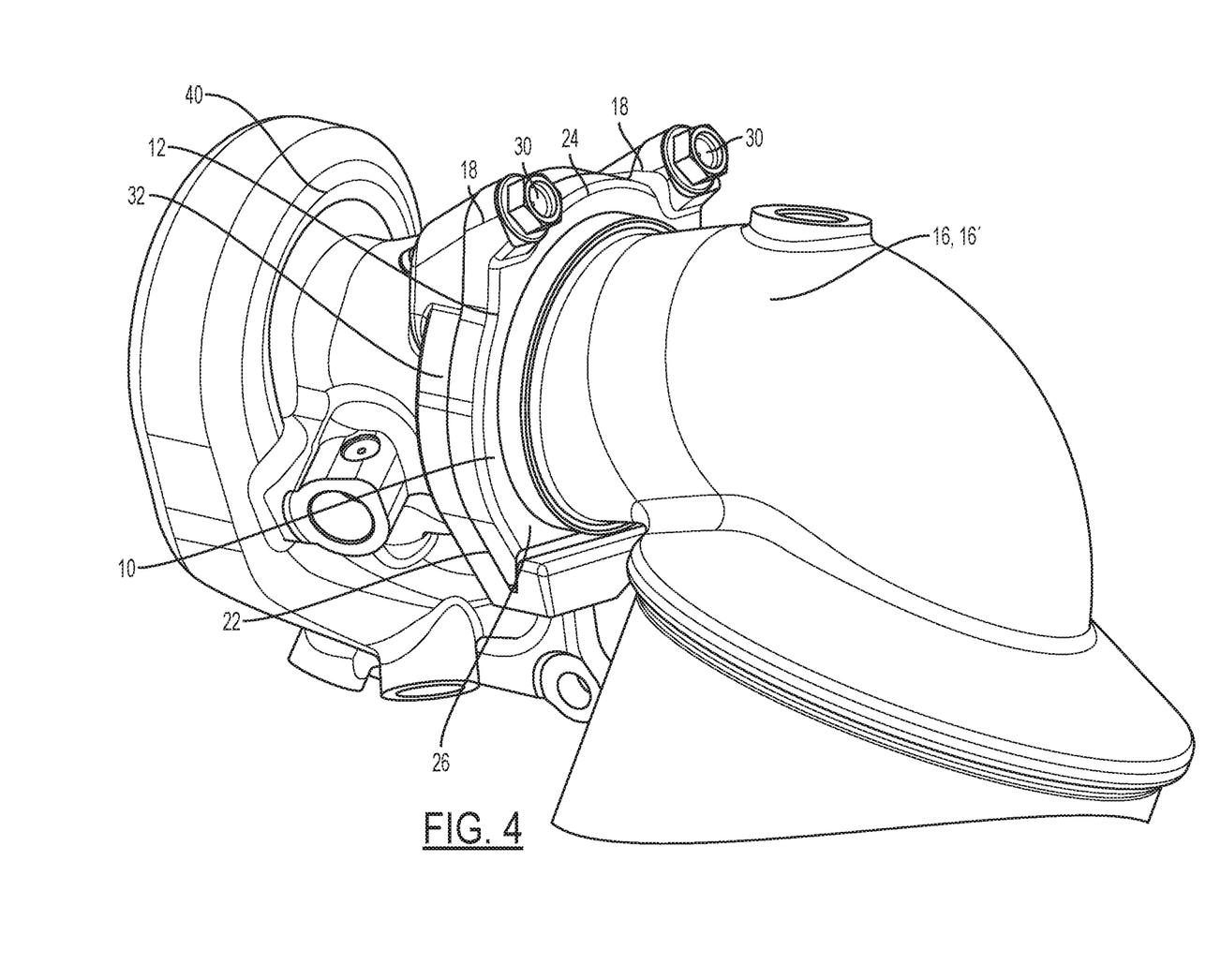
FIG. 4 is an enlarged view of the improved turbocharger-exhaust pipe joint having an example, non-limiting connector of the present disclosure wherein the connector includes a cast-in recess.
Figure 5:
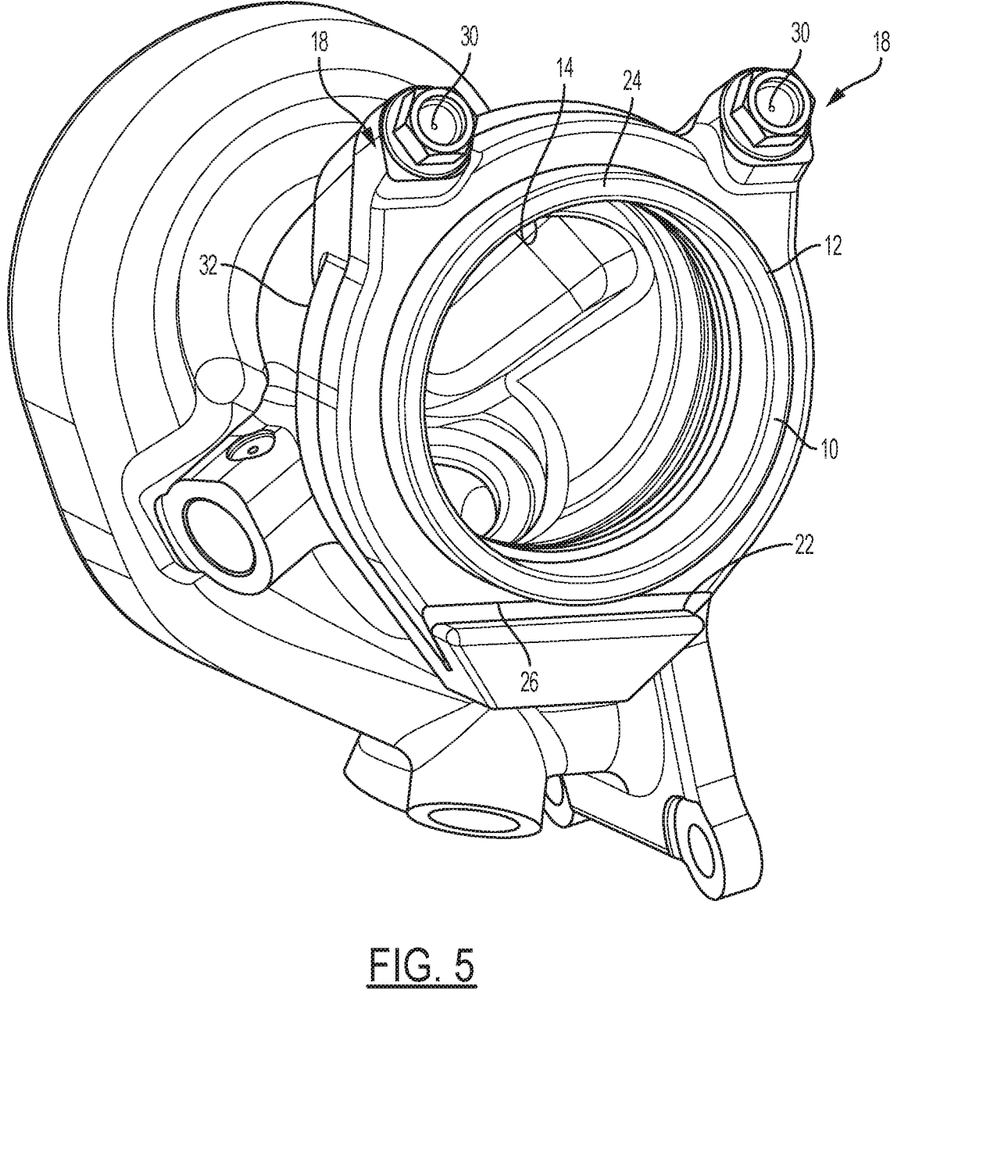
FIG. 5 is an enlarged view of the connector and the turbine housing without the exhaust pipe.
Figure 6:
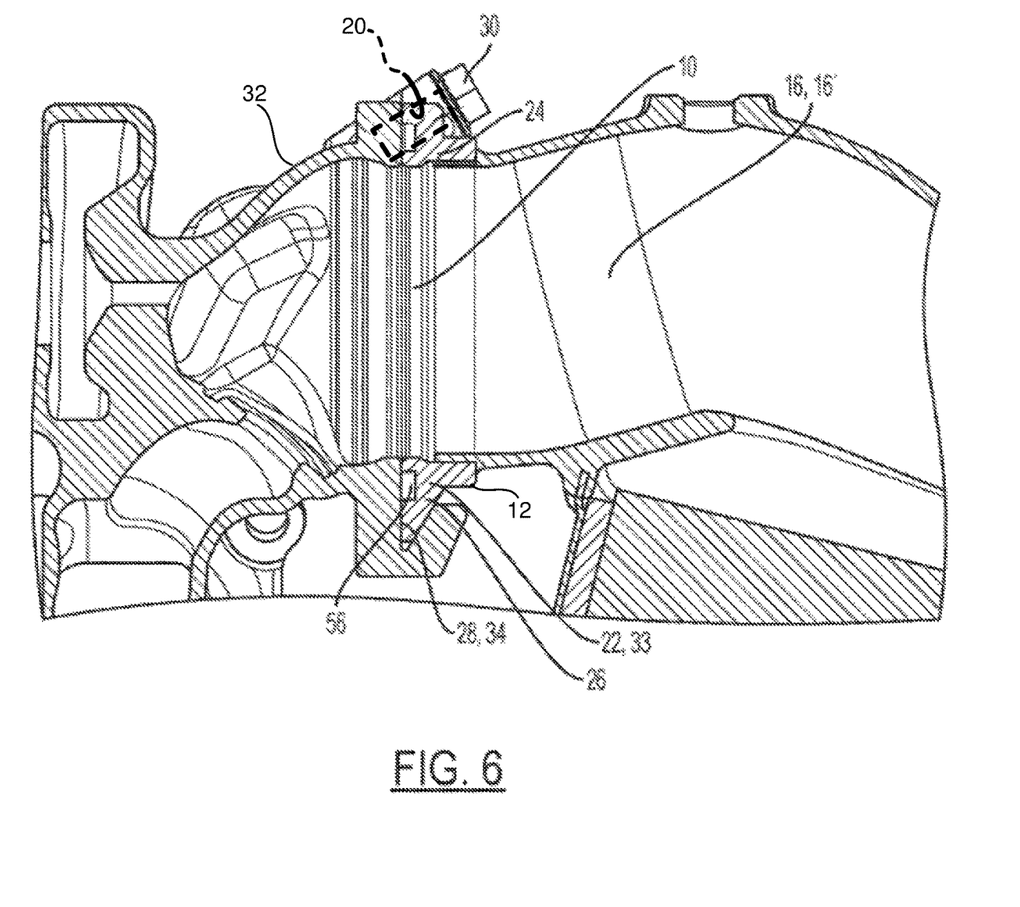
FIG. 6 is a cross-sectional view of the improved turbocharger-exhaust pipe joint of FIG. 4.

With reference now to the non-limiting example shown in FIG. 4, an improved connector 12 is provided wherein the improved connector 12 includes a support body 10 having an upper end 24 and a lower end 26. The support body 10 may define an aperture 14 (see FIG. 5) configured to support a second passageway 16 such as the exhaust pipe 16'. The second passageway 16 (see FIG. 6) or the exhaust pipe 16' may be welded to the support body 10 at the interface (FIG. 6) between the support body 10 and the second passageway 16. The upper end 24 of the support body 10 may include a fastener region 18 wherein one or more (angled) fastener apertures 20 are defined (see FIG. 6). These fastener apertures 20 are configured to receive a mechanical fastener 30 which joins the connector 12 (and second passageway 16) to a first passageway 32. While the first passageway 32 is represented as a turbine housing in the present disclosure, the first passageway 32 may be a cylinder head or other like structure. It is also understood that, at the lower end 26 of the support body 10, a flange region 22 may be defined at the lower end 26 such that the flange region 22 engages with a recess 28 formed (or cast) in a first passageway 32, The flange region 22 of the connector 12 may also have a v-shaped cross section as shown in FIG. 6 that mates with the v-shaped recess 28 formed in the turbocharger housing 40 (first passageway 32) in order to obtain a tight and secure fit between the turbocharger housing 40 (first passageway 32) and the connector 12.

As previously noted, one or more mechanical fasteners 30 may be provided to affix the connector 12 and the second passageway 16 to the first passageway 32. Where the fastener aperture 20 are formed at an angle as shown in FIG. 6, the flange region 22 of the connector 12 may be driven deeper into the recess 28 of the first passageway 32 as the mechanical fastener 30 is tightened/secured into place. As shown in FIG. 6, the recess 28 defined in the first passageway 32 may be v-shaped so as to vertically and horizontally support the connector 12 in proper position before the mechanical fasteners 30 join the exhaust pipe 16' (and connector 12) to the turbocharger housing 40 (first passageway 32). The v-shaped recess 28 also facilitates contact between the connector 12 and the turbocharger housing 40 even after assembly by providing both vertical support to the exhaust pipe 16' at the turbocharger joint and by also urging the exhaust pipe 16' horizontally toward the turbocharger housing 40.

In yet another embodiment of the present disclosure, a turbocharger assembly 80 for a vehicle is provided as shown in FIGS. 1A and 1B. The turbocharger assembly 80 includes a turbocharger housing 40, a journal bearing 48, a rotating assembly 50, a connector 12 and an exhaust pipe 16'. The turbocharger housing 40 may include a compressor inlet 44 and a turbine outlet 46 wherein the turbine outlet 46 defines a recess 28. The recess 28 maybe a feature which is cast into the turbocharger housing 40. It is also understood that the turbocharger housing 40 defines a bore 42 and a journal bearing 48 may be disposed within the bore 42. The journal bearing 48 may support a rotating assembly 50. The rotating assembly 50 may include a shaft 58 with a turbine wheel 60 on a first end 61 of the shaft 58 and a compressor wheel 62 on a second end 63 of the shaft 58, the shaft 58 being supported by the journal bearing 48 for rotation within the bore 42 about a longitudinal axis 52. The connector 12 may be affixed to the turbocharger housing 40 via at least one mechanical fastener 30. As shown in FIG. 6, the connector 12 may define flange region 22 which is configured to be disposed in the recess 28 of the turbocharger housing 40. The exhaust pipe 16' which is welded to the connector 12 may be coupled to the turbocharger housing 40 via the connector 12. As shown in FIG. 6, the recess 28 in the turbocharger housing 40 may be defined at a lower region of the turbine outlet 46 where it would otherwise be difficult for an assembly operator to access. The recess 28 which may be in the form of a v-shaped groove 34 is configured such that the recess 28 may easily receive the flange region 22 of the connector 12 as shown in FIG. 6 during the assembly process. As shown, in FIGS. 4-6, the flange region 22 of the connector 12 may having a v-shaped cross section 32 configured to be at least partially disposed in the v-shaped groove 34. With reference to FIG. 6, it is also understood that a gasket 56 may also be disposed between the connector 12 and the turbine outlet 46 to further prevent exhaust gases from leaking. Therefore, when one or more mechanical fasteners 30 affix the connector 12 to the turbocharger housing 40, such mechanical fastener(s) 30 may also compress the gasket 56 between the turbocharger housing 40 and the connector 12 as each mechanical fastener 30 is tightened. As a result, this arrangement provides for a robust joint which reduces the risk of leaking exhaust gases into the environment. With reference again to FIGS. 4-6, it is also understood that as each mechanical fastener 30 is tightened, the flange region 22 of the connector 12 may be further driven deeper into the recess 28 so as to further provide for a robust joint.

Figure 7:
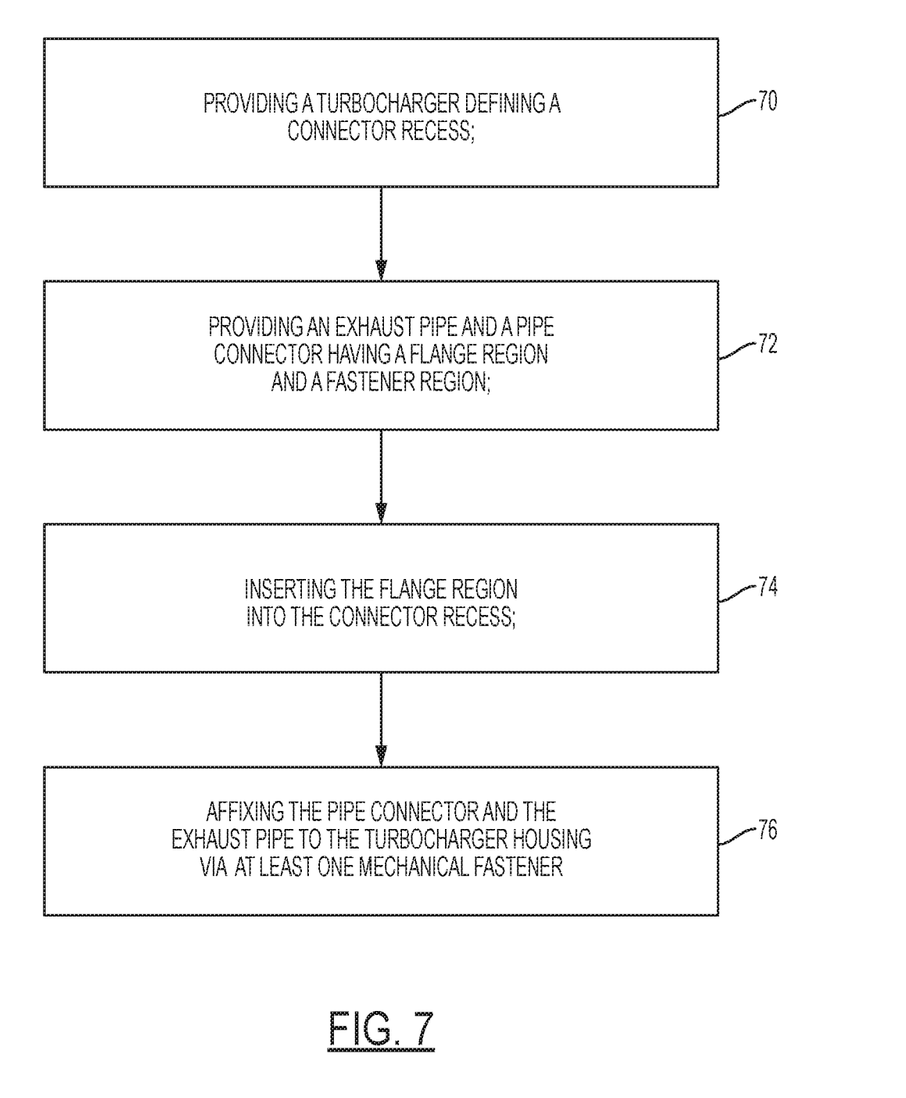
FIG. 7 is a flow chart which shows an example non-limiting method of manufacturing a turbocharger assembly.

With reference now to FIG. 7, the present disclosure also provides a method for manufacturing a turbocharger assembly 80 which includes the steps of: (1) providing a turbocharger which defines a recess 28 in the turbocharger housing 40 at the turbine outlet 46; step 70 (2) providing an exhaust pipe 16' and a connector 12 having a flange region 22 and a fastener region 18; step 72 (3) inserting flange region 22 into the recess 28; step 74 (4) affixing the connector 12 and the exhaust pipe 16' to the turbocharger housing 40 via a plurality of mechanical fasteners 30. Step 76 It is understood that the flange region 22 may be defined on a lower side of the connector 12 which is opposite to the fastener region 18. The fastener region 18 of the connector 12 may, but not necessarily, be defined on the upper end of the connector 12 given that the upper end of the connector 12 is easier for an assembly operator to access—while the flange region 22 may defined at a lower end of the connector 12 where access is much more limited. It is understood that the turbocharger housing 40 defines a turbine outlet 46 and the recess 28 is defined at a lower region of the turbine outlet 46—optionally via a casting process.

While example embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A nested flanged joint comprising:
   a first passageway defining a bore and a recess opened radially inward with respect to the bore, tangentially disposed to the bore, and extending linearly; and
   a support body defining an aperture, and configured to support a second passageway, the support body including:
      a fastener region defining an angled fastener aperture at an upper end of the support body, wherein the angled fastener aperture is angled with respect to the aperture defined by the support body, and
      a flange region extending partially circumferentially with respect to the aperture defined by the support body, projecting radially outward, defined at a lower end of the support body, and disposed in the recess.

2. The nested flanged joint as defined in claim 1 further comprising a mechanical fastener disposed in the angled fastener aperture, and configured to affix the support body and the second passageway to the first passageway while also radially driving the flange region into the recess of the first passageway.

3. The nested flanged joint as defined in claim 2 wherein the recess is v-shaped.

4. The nested flanged joint as defined in claim 3 wherein the flange region has a v-shaped cross-section.

5. A turbocharger assembly for a vehicle comprising:
   a turbocharger housing defining a bore, the turbocharger housing including a compressor inlet and a turbine outlet defining a recess, wherein the bore extends between and communicates through the compressor inlet and the turbine outlet, and the recess is open radially inward with respect to the bore;
   a journal bearing disposed within the bore;
   a rotating assembly having a shaft with a turbine wheel on a first end of the shaft and a compressor wheel on a second end of the shaft, the shaft being supported by the journal bearing for rotation within the bore about a longitudinal axis;
   a connector affixed to the turbocharger housing, the connector including a flange region projecting radially outward and disposed in the recess; and
   an exhaust pipe coupled to the turbocharger housing via the connector.

6. The turbocharger assembly as defined in claim 5 wherein the recess is defined at a lower region of the turbine outlet.

7. The turbocharger assembly as defined in claim 6 wherein the recess is a v-shaped groove.

8. The turbocharger assembly as defined in claim 7 wherein the flange region of the connector has a v-shaped cross section configured to be at least partially disposed in the v-shaped groove.

9. The turbocharger assembly as defined in claim 8 wherein the recess is formed at the turbine outlet via a casting process.

10. The turbocharger assembly as defined in claim 9 further comprising a gasket disposed between the connector and the turbine outlet.

11. The turbocharger assembly as defined in claim 10 further comprising a gasket and at least one mechanical fastener which is configured to compress the gasket between the connector and the turbine outlet while also driving the flange region into the recess as the at least one mechanical fastener couples the connector and exhaust pipe to the turbocharger housing.

12. The turbocharger assembly as defined in claim 11 wherein the exhaust pipe is welded to the connector.

13. A method for manufacturing a turbocharger assembly comprising the steps of:
   providing a turbocharger defining a bore and a recess opened radially inward with respect to the bore;
   providing an exhaust pipe and a connector defining an aperture in fluid communication with the bore, the connector having a flange region projecting radially outward with respect to the aperture and a fastener region;
   radially inserting the flange region into the recess; and
   affixing the connector and the exhaust pipe to the turbocharger housing via at least one mechanical fastener.

14. The method for assembling a turbocharger assembly as defined in claim 13 wherein the flange region of the connector is defined on a lower side of the connector which is opposite to the fastener region.

15. The method for assembling a turbocharger assembly as defined in claim 14 wherein the fastener region is defined at an upper end of the connector.

16. The method for assembling a turbocharger assembly as defined in claim 15 wherein the flange region is defined at a lower end of the connector.

17. The method for assembling a turbocharger assembly as defined in claim 16 wherein the turbocharger housing defines a turbine outlet and the recess is defined at a lower region of the turbine outlet.

18. The method for assembling a turbocharger assembly as defined in claim 17 wherein the at least one mechanical fastener is disposed at an angle relative to the turbine outlet.

19. The method for assembling a turbocharger assembly as defined in claim 18 wherein the recess has a v-shaped cross-section.

* * * * *